Feb. 16, 1954 S. W. BRIGGS 2,669,318
FILTER AND ADSORBER FOR FLUID TREATMENT
Filed Dec. 7, 1950 2 Sheets-Sheet 1
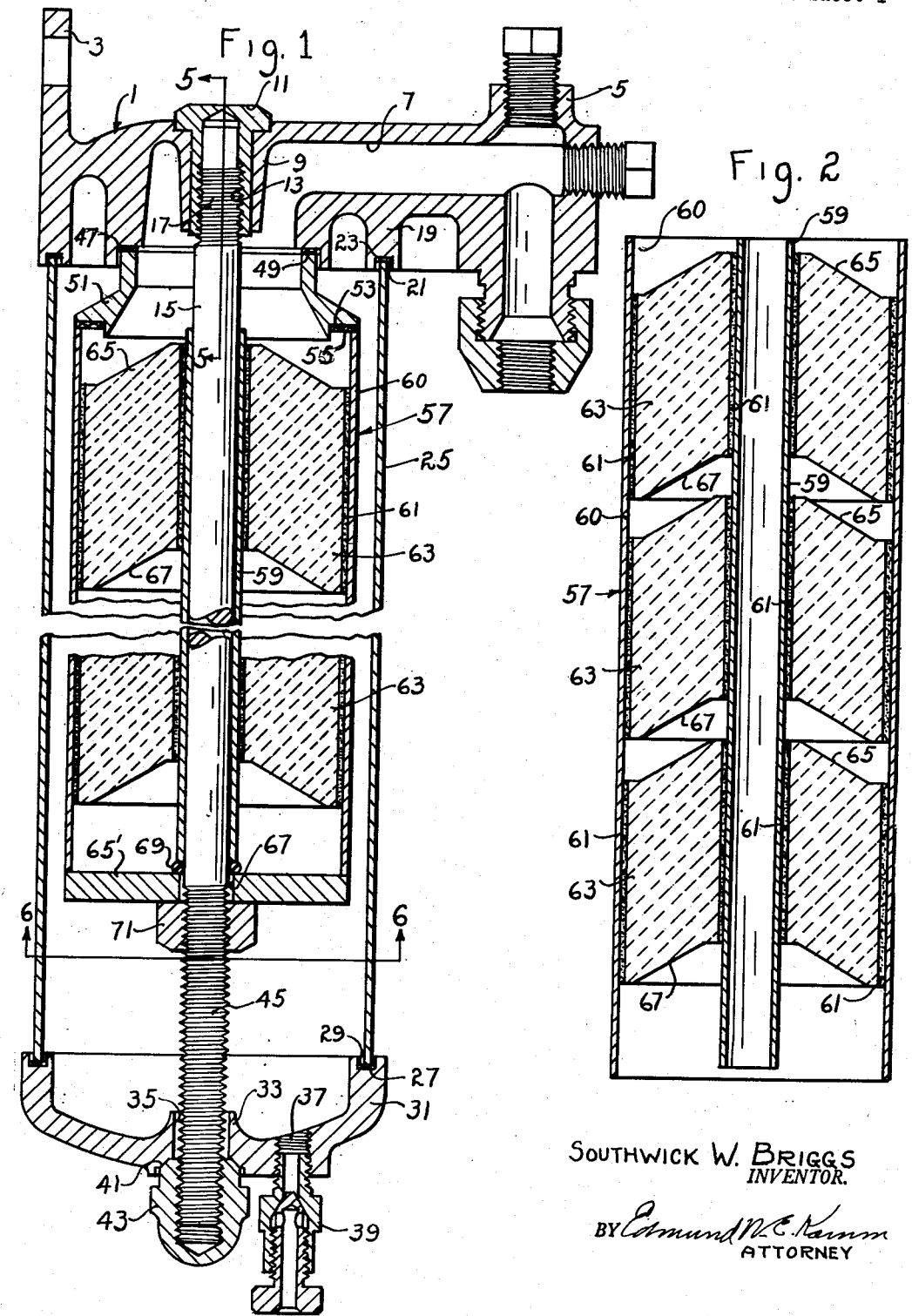
SOUTHWICK W. BRIGGS
INVENTOR.
BY Edmund W. C. Kamm
ATTORNEY Feb. 16, 1954     S. W. BRIGGS     2,669,318
FILTER AND ADSORBER FOR FLUID TREATMENT
Filed Dec. 7, 1950     2 Sheets-Sheet 2
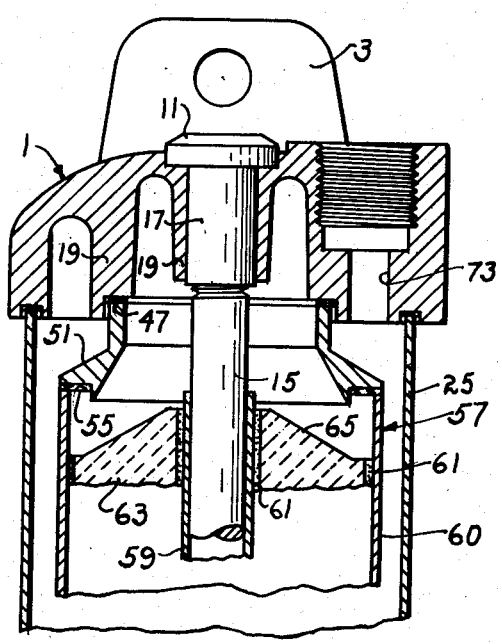
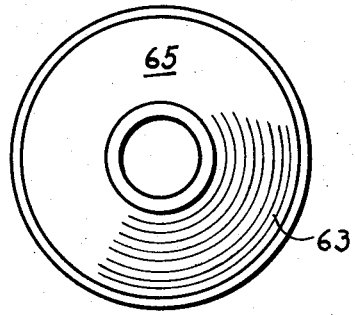
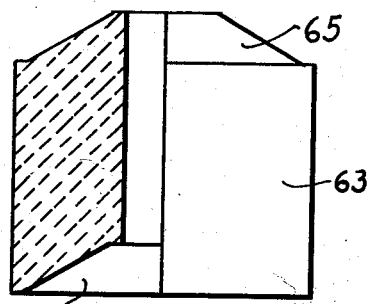
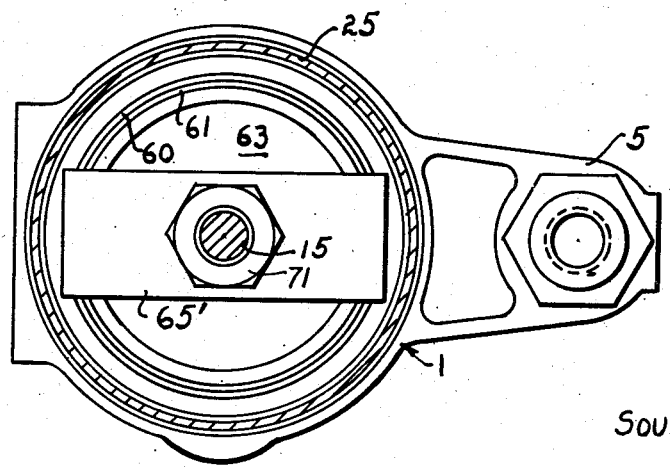
SOUTHWICK W. BRIGGS
*INVENTOR.*
BY *Edmund W. E. Kamm*
ATTORNEY Patented Feb. 16, 1954

2,669,318

UNITED STATES PATENT OFFICE 2,669,318

FILTER AND ADSORBER FOR FLUID TREATMENT

Southwick W. Briggs, Washington, D. C.

Application December 7, 1950, Serial No. 199,647

10 Claims. (Cl. 183—4.4)

This invention relates to a filter and adsorber for the treatment of fluids. More specifically, it relates to a device for removing water from air, refrigerants or other fluid as it flows in a conduit.

It is an object of the invention to provide a structure in which the separating medium can be readily installed and removed.

Another object of the invention is to provide a refill structure which incorporates the separator medium so that it can be quickly installed and removed.

A further object of the invention is to provide a refill structure which is staged to insure complete separation of water from the fluid.

Yet another object is to provide an adsorbent block which is shaped to facilitate the separation of moisture from the fluid.

Another object of the invention is to provide an adsorbent block which is shaped to control the drainage of free water therefrom.

Still another object of the invention is to provide an adsorbent block which is shaped so as to direct the flow of free water draining therefrom into a predetermined path.

These and other objects will become apparent from a study of the specification and the drawings which are attached hereto and are made a part hereof and in which:

Figure 1 is a vertical sectional view of the apparatus with the refill in place.

Figure 2 is a vertical sectional view of the refill.

Figure 3 is a plan view of the adsorbent block.

Figure 4 is an elevation of the block shown partially in section.

Figure 5 is a sectional view of the apparatus taken substantially on line 5—5 of Figure 1 showing the inlet.

Figure 6 is a sectional view of the apparatus taken substantially on the line 6—6 of Figure 1 to show the means for holding the refill in place.

Referring first to Figures 1, 5 and 6, the numeral 1 indicates a top head which has a support bracket 3 and an outlet spout 5 which includes the outlet channel 7. A boss 9 is formed on the head, depends therefrom, and has an insert 11 cast or otherwise sealed centrally therein. The insert is provided with a blind, threaded hole 13 therein which is coaxial with the boss. A tie rod 15 has a threaded end 17 which is received in the hole 13.

The head has a circular flange 19 depending therefrom which is provided with a groove 21 in which is seated a gasket 23. A cylinder 25 has one end seated on this gasket and the other end on a similar gasket 27, seated in a similar groove 29 in the bottom head 31.

The bottom head has a central boss 33 which is provided with a hole 35 through which the tie rod passes and with a drain hole 37 fitted with a drain cock 39. The lower end of the hole 35 is provided with a seat 41. An acorn nut 43 which screws on the threaded end 45 of the tie rod 15 is seated on 41 and serves to hold the heads and cylinder together to form an outer chamber or tank.

The head 1 has a radial seat 47 formed therein on which is a gasket 49. An adapter 51 rests at its upper end on the gasket and is provided with a radial seat 53 at its lower end to receive the gasket 55 on which one end of refill 57 rests.

As seen particularly in Figure 2, the refill comprises a central tube 59 and an outer cylinder or conduit 60 both of metal or other material, to both of which are cemented as at 61 a number of blocks 63 of adsorbent material.

A bar 65 having a central hole 67 therein is mounted on the tie rod 15. A rubber ring or seal 69 is disposed between the bar and the lower end of the tube 59 and the bar and a nut 71 on the threaded end 45 of the tie rod 15 compresses the bar and seal against the tube 59 and also forces the cylinder 60, gasket 53, adapter 51, gasket 47 and the top head into sealing relation with the parts adjacent them.

As shown particularly in Figure 5, the upper head has an inlet conduit 73 which communicates with the space between the cylinder 60 of the refill and the outer cylinder 25.

The adsorbent block or body 63 is porous and is preferably an activated metallic oxide such as aluminum, magnesium or iron oxide bonded together with a material containing the phosphoric acid radical, by the process disclosed in the patent issued to Herbert Hans Greger, Number 2,324,079, on July 13, 1943, for Adsorbent Material.

I prefer to make the block in a tubular form having thick walls and having a substantially conical, outwardly converging upper or apex end 65 and a substantially inwardly converging or recessed lower end 67 as is clearly shown in Figure 4. The cross-sectional form of a wall forms substantially a parallelogram as shown in Figure 4.

A number of blocks are cemented to the tube 59 and cylinder 60 in vertically spaced relation with each other and with the apices directed upwardly.

As a cement 61 for bonding the blocks to the tube and cylinder, I prefer to use paste made up of about 50% of silicate of soda, 10% of zinc oxide and 40% of water.

It is, of course, obvious that I may use other adsorbents, such as silica gel, carbon or fuller's earth instead of the metallic oxide disclosed in the Greger patent and that I may also use any suitable cementing material for bonding such blocks to the tube and cylinder.

Operation

In operation, the fluid contaminated with moisture is usually supplied, under pressure, to the conduit 73 through which it flows downward through the annular space formed by the cylinders 25 and 60 and thereafter upwardly past the end of cylinder 60 past bar 65' and through the first block 63. The fluid with some or all of the moisture removed then passes through the space between the first and second blocks and through the second block where a further amount of any residual moisture in the fluid is either partially or completely removed and so on through the remainder of the blocks.

The conical surface 67 in each block increases the area which is exposed to the fluid and thereby retards plugging of the unit by foreign solids. It also causes the gravitation of any droplets of moisture, which may collect on the surface, to the outer peripheral zone thereof where they will coalesce with other particles or droplets until they become heavy enough to drop from the block.

If the moisture thus collected is in one of the upper blocks it will drop into the circular channel formed by the conical portion 65 of the adjacent lower block and the cylinder 60 which serves as a reservoir to hold it so that it may eventually filter downwardly through the blocks, near the outer periphery thereof and be eventually discharged into the lower portion of the tank where it can be drawn off through the cock 39.

This guiding of non-adsorbed, separated liquid into a predetermined zone or path also prevents the reentrainment of the liquid in the fluid and thus enables a given amount of moisture to be removed by a lesser quantity of adsorbent than would be otherwise possible, since additional blocks would be required to insure against moisture carrying over.

The dried fluid then passes out the outlet channel 7 to the point of use.

When the refill becomes plugged or ineffective to the degree required, the nut 43, head 31, cylinder 25, nut 71, bar 65' and seal 69 are removed. This permits the refill to be slipped from the tie rod 15 and a new one to be installed in its place. The removed unit may then be reactivated by heating it.

It should be noticed that the seal 69 and gaskets 55 and 47 prevent any fluid from by-passing the blocks.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A refill for an adsorber comprising a tube, a number of integral, porous blocks of frangible adsorbent material disposed in the tube in spaced relation therealong and means for sealingly holding the blocks in the tube, the contiguous surfaces of adjacent blocks being formed so that one of said surfaces defines a cavity and the other defines a protuberance.

2. A refill for an adsorber comprising a pair of concentric tubes, a number of integral, porous blocks of frangible adsorbent material disposed in the space between the tubes in spaced relation therealong and means for sealingly holding the blocks to both of said tubes, the contiguous surfaces of adjacent blocks being formed as surfaces of revolution, one of said surfaces defining a cavity and the other surface defining a protuberance, said axes of revolution of said surfaces and the longitudinal axes of said tubes being substantially coincident.

3. A refill for an adsorber comprising a pair of concentric tubes, a number of integral, porous blocks of frangible adsorbent material disposed in the space between the tubes in spaced relation therealong and means for sealingly holding the blocks to both of said tubes, the contiguous surfaces of adjacent blocks being in the form of a conic frustum, one of said surfaces defining a cavity and the other surface defining a protuberance, said axes of revolution of said surfaces and the longitudinal axes of said tubes being substantially coincident.

4. In a stripper and adsorber, a tank having an inlet and an outlet, means defining a path for fluid between said inlet and outlet including a substantially vertical, upwardly directed conduit, a number of integral, porous bodies of finely divided, bonded, adsorbent material, each having an inlet and an outlet surface, and means for sealingly interposing said bodies in said conduit in superposed spaced relation, each body being constructed and arranged to provide an inlet surface having a portion thereof disposed at a lower level than the remainder, whereby separated free liquid collected on the surface will drain toward said portion.

5. In a stripper and adsorber, a tank having an inlet and an outlet, means defining a path for fluid between said inlet and outlet including a substantially vertical, upwardly directed conduit, a number of integral, porous bodies of finely divided, bonded, adsorbent material, each having an inlet and an outlet surface, and means for sealingly interposing said bodies in said conduit in superposed spaced relation, each body being constructed to provide an inlet surface having a portion thereof disposed at a lower level than the remainder of the surface whereby separated liquid collected on the surface will drain toward said portion, the body disposed subjacent said surface being constructed to provide an outlet surface having the portion thereof immediately subjacent said inlet surface portion, disposed at a lower level than the remainder of said outlet surface, whereby to provide a reservoir for liquid drained from said inlet surface portion.

6. The structure defined in claim 5 wherein said inlet and outlet surfaces are surfaces of revolution generated about a substantially vertical axis, the one surface defining a cavity and the other defining a protuberance.

7. The structure defined in claim 5 wherein said inlet and outlet surfaces are substantially conical surfaces having their central axes substantially vertical, the one surface defining a cavity and the other a protuberance.

8. The structure defined in claim 5 wherein each inlet surface defines a cavity and the subjacent outlet surface defines a protuberance.

9. The structure defined in claim 4 wherein said porous bodies comprise particles of adsorbent material bonded together to form a porous integral block.

10. Apparatus for the separation of a liquid from a fluid in which it is entrained comprising a casing having an inlet and an outlet, a conduit supported in the casing with its upper end communicating with the outlet and its lower end communicating with the inlet, and a plurality of integral, adsorbent blocks mounted in spaced vertical alignment in the conduit, the outer edge of the blocks in sealed engagement with the conduit, the lower surface of the blocks sloping to a lowermost, depending area and the upper surface of the blocks sloping to a recessed area in vertical alignment with said depending area, whereby liquid coalesced on the lower surface of a block drains to the lowermost area and from there to the recessed area of the next lower block.

SOUTHWICK W. BRIGGS.

References Cited in the file of this patent

UNITED STATES PATENTS

| Number | Name | Date |
|---|---|---|
| 779,201 | Blackmarr et al. | Jan. 3, 1905 |
| 1,746,774 | Jenkins | Feb. 11, 1930 |
| 2,026,935 | Downs | Jan. 7, 1936 |
| 2,225,990 | Henry | Dec. 24, 1940 |
| 2,304,829 | Kamrath | Dec. 15, 1942 |
| 2,325,657 | Burkness | Aug. 3, 1943 |
| 2,406,278 | Worth | Aug. 20, 1946 |